United States Patent [19]

Finkelstein et al.

[11] Patent Number: 4,520,844
[45] Date of Patent: Jun. 4, 1985

[54] REGULATOR VALVE FOR STABILIZING VOLUME FLOW, ESPECIALLY IN VENTILATION SYSTEMS

[75] Inventors: Wolfgang Finkelstein; Josef Haaz, both of Neukirchen-Vluyn, Fed. Rep. of Germany

[73] Assignee: Gebruder Trox, GmbH, Neukirchen-Vluyn, Fed. Rep. of Germany

[21] Appl. No.: 477,752

[22] Filed: Mar. 22, 1983

[30] Foreign Application Priority Data

Oct. 21, 1982 [DE] Fed. Rep. of Germany ... 8229509[U]

[51] Int. Cl.³ .............................................. F24F 13/08
[52] U.S. Cl. ................................. 137/486; 137/487.5; 251/127
[58] Field of Search ............... 137/486, 487.5; 236/49; 138/37, 41, 42; 73/272, 861.89, 861.78; 251/127

[56] References Cited

U.S. PATENT DOCUMENTS

| | | | |
|---|---|---|---|
| 3,806,027 | 4/1974 | Ginn | 137/84 X |
| 4,142,413 | 3/1979 | Bellinga | 73/272 R X |
| 4,449,664 | 5/1984 | Mithuhira | 137/486 X |
| 4,451,207 | 5/1984 | Hoffmann | 73/861.89 X |

Primary Examiner—Alan Cohan
Attorney, Agent, or Firm—Shlesinger, Arkwright, Garvey & Fado

[57] ABSTRACT

The invention concerns a regulator valve for stabilizing volume flow, especially in ventilation systems, with an adjustment flap (4) which is pivotable mounted in a flow conduit (2) and can be adjusted by a variable adjusting motor (12) and with a measuring probe (14) located in the flow conduit (1 resp. 2). In order that a reliable regulation and stabilization of the volume flow is possible independently of the arrangement and of the configuration of the conduit system upstream from the regulator valve, a turbulence grate (6) should be located upstream from the adjustment flap (4).

20 Claims, 3 Drawing Figures

REGULATOR VALVE FOR STABILIZING VOLUME FLOW, ESPECIALLY IN VENTILATION SYSTEMS

The invention concerns a regulator valve for stabilizing volume flow, especially in ventilation systems, with an adjustment flap which is pivotably mounted in a flow conduit and is adjusted by a variable adjusting motor and with a measuring probe.

Such regulator valves are also designated as volume flow regulators. They are primarily used in ventilation systems, especially in air-conditioning systems, in large numbers. They have the task of assuring that the required volume flow enters the room to be air-conditioned within close tolerances, independent of pressure conditions, pressure variations and the particular configuration of the conduit system before the entry into the room. These last-named dependencies in particular frequently result in undesired changes in the volume flow, which is determined by a measuring of the flow speed in the flow conduit. However, the measuring result also depends on the state of the flow, which for its part is set as a function of the shape and configuration of the conduit system.

Various types of regulator valves of the type initially described, respectively volume flow regulators are known. They are operated either with electrical or pneumatic auxiliary energy and measuring probes which emit either a speed-dependent or a pressure-denendent signal constitute the basis for the regulation of the volume flow to be stabilized.

All types share the common problem that the speed profile in the flow conduit changes according to the particular conduit sections located upstream, so that a site for the measuring probe which was selected by the factory does not constitute a sufficiently defined basis for stabilizing the volume flow even if the characteristic of the measuring probe is precisely known in detail and if the regulator is set to it.

The invention therefore has the task of providing a regulator valve of the type initially described with which the volume flow can be stabilized within close tolerances independently of the construction and the configuration of the upstream conduit system and independently of the measuring probe built in and set by the factory This task is solved by a regulator valve of the type initially described in which a turbulence grate is located upstream from the adjustment flap.

It was found that the distribution of speed in the flow conduit is evened out to a large extent behind the turbulence grate, so that even at a short distance behind the turbulence grate a reliable speed measurement is possible which can constitute the basis for the regulation of the volume flow.

Particularly favorable conditions are obtained if the turbulence grate consists of two partial grates which are arranged at an angle open on the upstream side and which in particular can form an acute angle with one another. A practical embodiment is characterized in that the rates are flat and their line of contact extends parallel to the axle of the adjustment flap. Flat partial grates are easy to manufacture and to build into a corresponding flow conduit. If, in addition, their line of contact extends parallel to the axis of the adjustment flap, a speed profile is created downstream from the turbulence grate which makes it possible to measure the speed practically independently of the location of the measuring probe.

The effects described are also achieved even if the partial grates cover the flow conduit section only partially, in which case, however, it is suitable to place the measuring probe in the flow shadow of the turbulence grate.

In any case, the distance of the turbulence grate resp. of the line of contact from the axle of the adjustment flap can be smaller than the diameter of the flow conduit. This makes possible a very short total construction length of the volume flow regulator, so that it can be added in directly behind bends, branch lines or the like without adversely affecting the regulation of the volume flow.

The measuring probe itself can be positioned on the side of the adjustment flap which faces upstream. Only if partial grates are used which do not cover the full flow section must care be taken that the measuring probe is located in the flow shadow of the turbulence grate.

The measuring probe can also be positioned between the turbulence grate and the adjustment flap. It was surprizingly found that reliable measuring results are obtained even if the measuring probe is positioned upstream in front of the turbulence grate in the angular area formed by the two partial grates.

Basically, the speed can be measured with known measuring probes such as a Pitot tube, a Prandtl tube, a hot-wire anemometer or a pneumatic free jet amplifier with a proportional response curve.

A straightener can be located downstream from the adjustment flap. This straightener extends in particular only partially over the flow section and has the task of evening out the speed profile at the exit of the regulator valve, of eliminating disturbing influences produced by the adjustment flap itself and of reducing the flow noise produced in the choke position of the adjustment flap. In addition, the straightener also has a favorable effect on the preciseness of the measuring signal of the measuring probe.

Embodiments of the invention which are shown in the drawings are discussed below.

Figure 1:
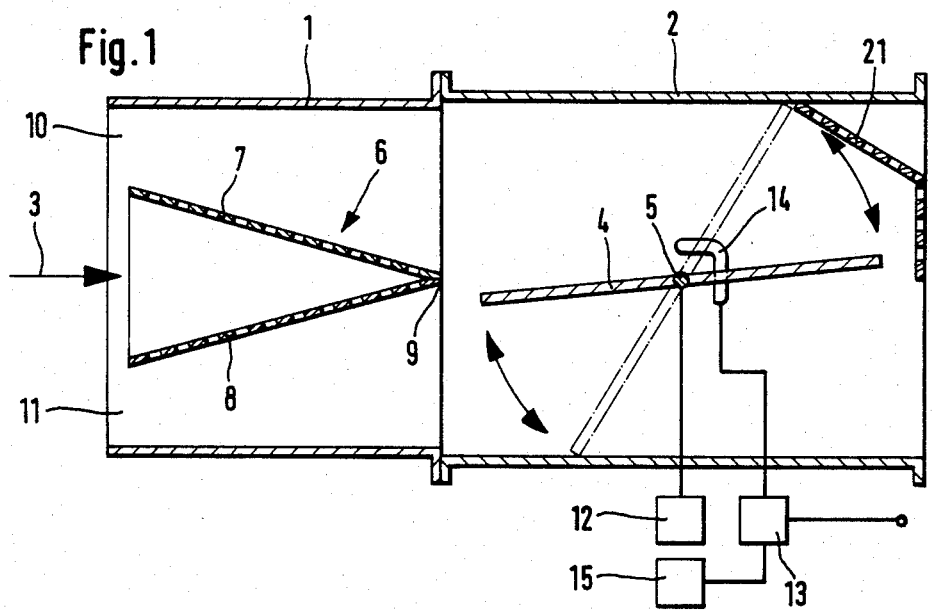
FIG. 1 shows a schematic view of a regulator valve for stabilizing the volume flow in an air-conditioning system.

The regulator valve shown in FIG. 1 has two conduit sections 1, 2 which are connected to each other. Conduit sections 1, 2 can have a circular or rectangular to square flow section. The direction of flow is indicated by arrow 3. An adjustment flap 4 is mounted in downstream conduit section 2, and can pivot about a horizontal axle 5 arranged symmetrically to the conduit section. Axle 5 is also symmetrically arranged in relation to adjustment flap 4. The pivot range of adjustment flap 4 is indicated in dotted lines.

Conduit section 1 receives a turbulence grate 6 which consists in the embodiment shown of two partial grates 7, 8 arranged at an angle to one another which is open on the upstream side. In the embodiment shown the angle between two partial grates 7, 8 is ca. 33°. The two partial grates 7, 8 meet in the conduit center along line of contact 9, which extends parallel to axle 5 of adjustment flap 4 and likewise in the center of conduit section 1. The distance of line of contact 9 from axle 5 is less than the diameter resp. a significant dimension of the section of conduit section 2.

As is shown, partial grates 7, 8 end at a distance from their associated walls of conduit section 1, so that grate-free sectional areas 10, 11 remain between the free ends of partial grates 7, 8 and the associated conduit walls.

Adjustment flap 4 is connected over a linkage to adjusting motor 12 which receives control impulses from regulator 13 which transmits them according to a measuring signal furnished by measuring probe 14. In addition, the regulator has another input for signals, eg. those of a thermostat 15.

In the embodiment shown in FIG. 1 measuring probe 14 is located on the side of adjustment flap 4 which faces upstream. The drawing indicates that measuring probe 14 is a Prandtl tube with which the total flow pressure on the one hand and the static flow pressure on the other hand are measured and at the same time the difference of both pressures is formed, so that the measured signal is a measure for the flow speed.

Figure 3:
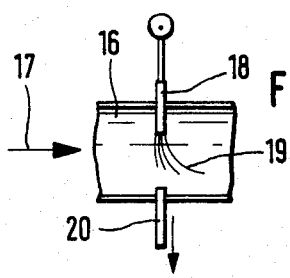
FIG. 3 shows a schematic view of a section through a measuring probe.

In an embodiment which is not shown, measuring probe 14 can also be hot-wire anemometer. Measuring probe 14 can also be constructed in the fashion of a pneumatic free jet amplifier with proportional response curve, as is indicated in FIG. 3. In this instance measuring probe 14 has a conduit 16 open in the direction of flow into which a jet 19 of compressed air is blown transversally to the direction of flow 17 via nozzle 18. This jet 19 is deflected to a greater or lesser extent by the flow, so that a receiver jet 20 located opposite jet 18 can furnish a pressure signal which is stronger or weaker in a corresponding manner and which constitute a measurement for the flow speed.

The regulator valve shown requires a very short construction length. Due to the effect of turbulence grate 6 on the upstream side of adjustment flap 4, a very even distribution of speed is obtained over the conduit section even behind turbulence grate 6 if the upstream conduit system has bends, branch lines and the like—at least no rather long calm stretches—at a short distance in front of the regulator valve.

FIG. 1 also shows that a straightener 21 is provided downstream from the adjustment flap at a short distance from adjustment flap 4 and practically directly behind adjustment flap 4. This straightener 21 extends in the embodiment shown only over the upper area of conduit section 2. It is supposed to influence the flow disturbed by adjustment flap 4 in such a manner that the speed profile at the exit of conduit section 2 is evened out again and that any flow noises which occur are reduced. In particular, the acoustic spectrum can be changed so that low-frequency noises are reduced by 5 to 10 decibels. The straigtener also influences the preciseness of the measuring signal of measuring probe 14.

Figure 2:
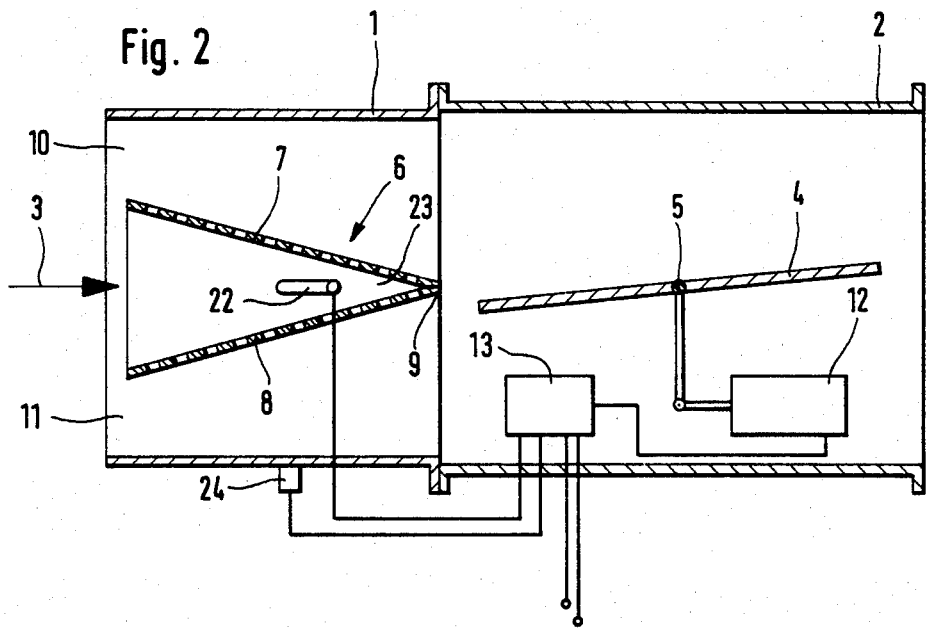
FIG. 2 shows another embodiment of the object according to FIG. 1.

In FIG. 2 the same reference numerals designate the same parts. The regulator valve is constructed basically as described above. The only difference is the arrangement of measuring probe 14, which is a Pitot tube 22 in the embodiment of FIG. 2 located in angular area 23 between the two partial grates 7, 8. Since Pitot tube 22 measures only the total pressure of the flow, another measuring station 24 for measuring the static flow pressure is provided in the wall of conduit section 1. Leads run from both measuring stations 22, 24 to regulator 13, which forms the pressure difference. Since the connection between measuring stations 22 and 24 on the one hand and regulator 13 on the other hand is established over leads, the measuring stations can also be connected to a manometer (not shown) with which a direct checking of the volume flow is possible. This also makes it possible, among other things, to obtain information on the volume flow with a high degree of precision during acceptance measurements.

We claim:
1. A regulator valve, comprising:
   (a) a flow conduit with an upstream end and a downstream end;
   (b) an adjustment flap pivotally mounted in said conduit and associated with said downstream end for adjusting the flow of fluid through said conduit;
   (c) flow measuring means disposed at least in part in said conduit for monitoring the flow rate of fluid flowing through said conduit;
   (d) means operably associated with said adjustment flap and with said flow measuring means for causing pivoting of said adjustment flap; and,
   (e) at least two turbulence grates disposed in said conduit and associated with said upstream end and each of said grates has a first end and a second end and said second ends being spaced apart and said first ends being joined together downstream of said second ends so that said grates are angularly disposed and said second ends are spaced from the periphery of said conduit whereby fluid flowing through said conduit is stabilized.

2. The regulator as defined in claim 1, wherein:
   (a) said turbulence grates disposed at an acute angle.

3. The regulator as defined in claim 2, wherein:
   (a) said angle is approximately 33°.

4. The regulator as defined in claim 1, wherein:
   (a) each of said grates is substantially planar.

5. The regulator as defined in claim 4, wherein:
   (a) said adjustment flap is pivotally secured to an axle; and,
   (b) joining of said first ends defines a line of contact disposed parallel to said axle.

6. The regulator as defined in claim 5, wherein:
   (a) the distance from said line of contact to said axle is less than the diameter of said conduit.

7. The regulator as defined in claim 1, wherein:
   (a) said flow monitoring means disposed upstream of said adjustment flap.

8. The regulator as defined in claim 1, wherein:
   (a) said flow monitoring means disposed between said turbulence grates and said adjustment flap.

9. The regulator as defined in claim 1, wherein:
   (a) said flow monitoring means disposed upstream of and between said turbulence grates.

10. The regulator as defined in claim 1 wherein:
    (a) said flow monitoring means includes a Pitot tube.

11. The regulator as defined in claim 1 wherein:
    (a) said flow monitoring means includes a Prandtl tube.

12. The regulator as defined in claim 1, wherein:
    (a) said flow monitoring means includes a hot-wire anemometer.

13. The regulator as defined in claim 1, wherein:
    (a) said flow monitoring means includes a pneumatic free jet amplifier with a proportional response curve.

14. The regulator as defined in claim 1, wherein:
    (a) a straightener disposed in said conduit downstream of said adjustment flap.

15. The regulator as defined in claim 14, wherein:

(a) said straightener extends partially over a section of said conduit.

16. A regulator valve, comprising:
   (a) a flow conduit with an upstream end and a downstream end;
   (b) an axle associated with said downstream end and extending into said conduit;
   (c) an adjustment flap pivotally mounted to said axle;
   (d) flow monitoring means disposed at least in part in said conduit for monitoring the flow rate of fluid flowing through said conduit;
   (e) means operably associated with said adjustment flap and with said flow monitoring means for causing pivoting of said adjustment flap for thereby regulating the flow of fluid through said conduit; and,
   (f) first and second turbulence grates disposed in said conduit and associated with said upstream end and each of said turbulence grates has a first and a second end, said second ends being spaced apart and spaced from the wall of said conduit and said first ends being joined together along a line of contact downstream of said second ends so that said grates are angularly disposed and subtend an acute angle whereby fluid flowing through said conduit is velocity stabilized.

17. The regulator as defined in claim 16, wherein:
   (a) said grates are flat and said line of contact is substantially parallel to said axle.

18. The regulator as defined in claim 16, wherein:
   (a) said axle being spaced from said line of contact a distance less than the diameter of said conduit.

19. The regulator as defined in claim 16, wherein:
   (a) said flow monitoring means disposed upstream of said axle.

20. The regulator as defined in claim 16, wherein:
   (a) said flow monitoring means disposed upstream of and between said turbulence grates.

* * * * *